7403X
H. Vail,
Fence Post,
Patented Feb. 1, 1833.
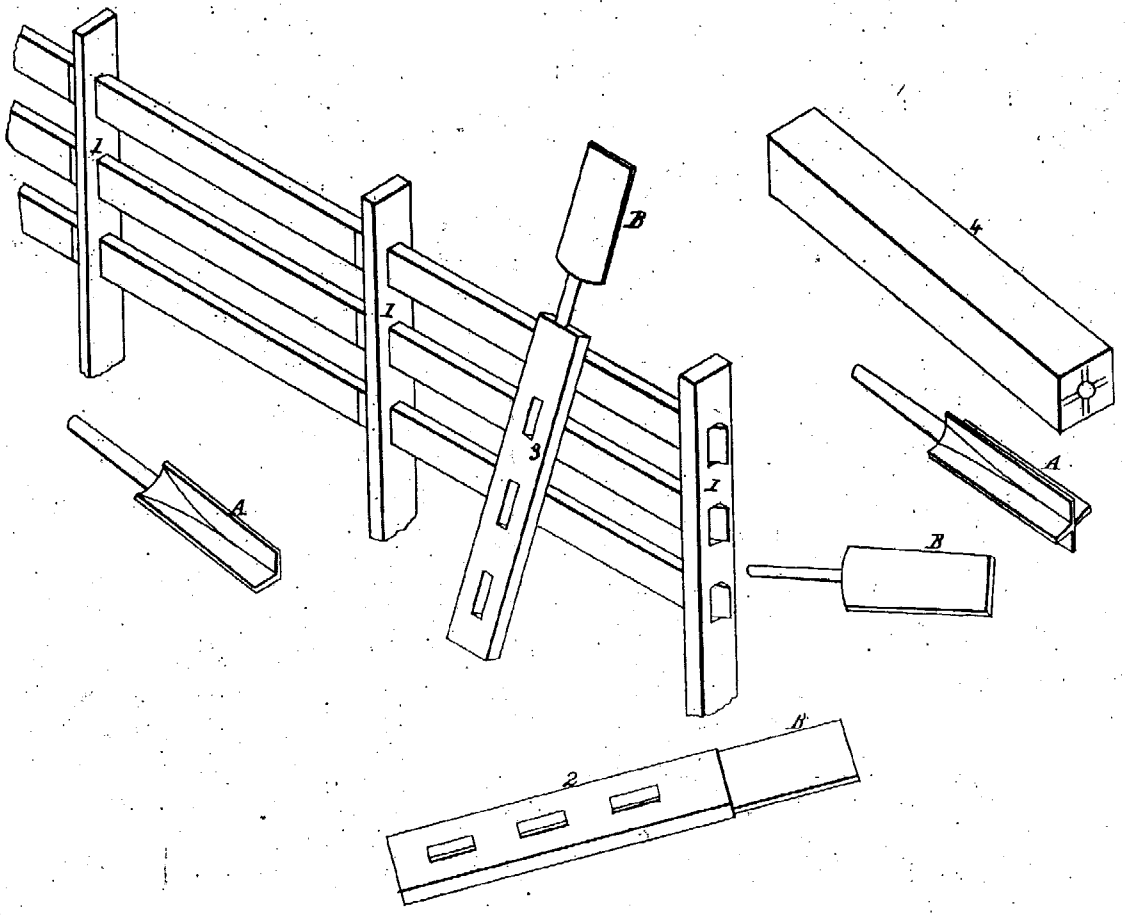
H. PETERS, PHOTO-LITHOGRAPHER, WASHINGTON, D. C.

[illegible] X Feb 1, 1833 [illegible]

Henry Vail
Letters Patent

The Schedule referred to in these Letters Patent and making part of the same containing a description in the words of the said Henry Vail him-self of his improvement in Fence Posts To all to whom these presents shall come.

Be it known that I Henry Vail of the town of Cortlandville in the County of Cortland & State of New York have invented a new & useful im-provement on Fence posts or other posts placed in situations where the lower part is liable to decay & that the following is a full & exact description of the construction of said improvement as invented by me. That portion of the post placed in the ground or liable to decay is to be made of iron. The iron is to be cast or [illegible] in the shape of an ordinary spade except the blade should be straight. A spike or shaft extends upward from the upper end of the blade & should be about nine inches long to support an ordinary fence post. This shaft should be about one inch & a quarter in diameter where it joins the blade & about three quarters of an inch at the upper end & is in-serted into a round hole made with a common taper cut in the lower end of the post. The blade or lower part should be about four inches wide & 15 inches long a little [illegible] in the middle where the shaft is joined on. The above description is calculated for an ordinary fence post (say one of four inches square) & may be varied according to the height of the post or the use to which it is to be applied. For gate or other posts stand-ing alone & liable to move in more than one direction, a wing or wings should be [illegible] to the above blade standing out & forming right angles with the line of the above blade.

Henry Vail

Witnesses
Henry Hopkins
[illegible]
[illegible]